(12) United States Patent
Duff et al.

(10) Patent No.: US 8,436,867 B1
(45) Date of Patent: May 7, 2013

(54) SYSTEM AND METHOD FOR GENERATING COMPUTER GRAPHIC IMAGES BY IDENTIFYING VARIANT AND INVARIANT SHADER ARGUMENTS

(75) Inventors: Thomas Douglas Selkirk Duff, Berkeley, CA (US); Robert L. Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 804 days.

(21) Appl. No.: 12/614,303

(22) Filed: Nov. 6, 2009

(51) Int. Cl.
*G09G 5/00* (2006.01)

(52) U.S. Cl.
USPC ........... 345/581; 345/619; 345/440; 717/104; 717/105; 717/114; 717/124; 717/125; 717/127; 717/131; 717/144; 717/151

(58) Field of Classification Search ........................ None
See application file for complete search history.

(56) References Cited

U.S. PATENT DOCUMENTS

| | | | | |
|---|---|---|---|---|
| 6,578,197 B1 * | 6/2003 | Peercy et al. | ................. | 717/143 |
| 7,064,761 B2 * | 6/2006 | Grassia et al. | ................. | 345/473 |
| 7,788,635 B2 * | 8/2010 | Heirich | .......................... | 717/104 |
| 8,037,449 B2 * | 10/2011 | Iborra et al. | ................. | 717/105 |
| 2007/0174812 A1 * | 7/2007 | Yang | .............................. | 717/114 |

* cited by examiner

*Primary Examiner* — Antonio A Caschera
(74) *Attorney, Agent, or Firm* — Kilpatrick Townsend & Stockton LLP

(57) ABSTRACT

A degree of detail calculation required for calculations to process computer graphics data is determined based on input parameters that are varying in certain dimensions. During a detail analysis of a shader, a directed graph is built in such a way that each connection between nodes indicates a dependency among inputs and outputs of calculations and/or input parameters. For each input parameter, variability information about the input parameter is obtained. A lattice or a table representing dimensional variability is used to determine a variability value for each calculation for given input parameters and dependency relationships among other calculations. After a variability value has been determined for each calculation, calculations are grouped into several groups and executed once per the variability value.

25 Claims, 6 Drawing Sheets

|  | Varying per Object | Varying per Point |
|---|---|---|
| Varying per Shot | (I,I)<br>Light, Ci | (V, I)<br>Texture Mapping |
| Varying per Frame | (I,V)<br>N (Normal), P (Position) | (V, V) |

SYSTEM AND METHOD FOR GENERATING COMPUTER GRAPHIC IMAGES BY IDENTIFYING VARIANT AND INVARIANT SHADER ARGUMENTS

BACKGROUND

Embodiments of the present invention are directed to the computer generation of graphics images for use in the production of animated films, and more specifically, to systems and methods for reducing the computational and data storage resources used to generate such images. In some embodiments, this is accomplished by determining which input parameters for a specific software model used to generate an image are variant or invariant across an object or between frames, and then using that information to determine which calculations that are part of those models can be made once and used again later and which calculations must be re-calculated due to dependencies on changing parameters.

Rendering is the process of generating an image from a model by means of executing one or more computer programs. The model is typically a description of a three dimensional object in a strictly defined language or data structure. A typical model may contain geometry, viewpoint, texture, lighting, and shading (the color or other characteristics of the surface appearance) information about an object and the scene in which the object appears. In a simple rendering process, an element in the scene or image is modeled and then the software calculates how that element appears to a viewer (at a specified location and viewing angle) when light (typically multiple light sources) illuminates the element.

A typical rendering process uses a computer routine referred to as a shader to describe the interaction of light sources and object surfaces, and to determine certain visual characteristics of the object (e.g., color, surface roughness, etc.). A shader routine may have a set of input parameters, with some of the parameters varying over an object in a frame, and some of the parameters being invariant over the object in a given frame. Similarly, some of the input parameters may vary between frames, while others are invariant between two frames. Since a shader is one of many routines or models executed in generating a scene (i.e., it is part of a rendering pipeline) the value of its input parameters may also depend upon the output of a routine executed previously in the pipeline.

Rendering an image or frame of an animated film is a time-consuming and computationally intensive process. Significant computational resources and data storage may be required to generate each frame in an animated film. In some cases, as much as 90% of the time required for a rendering process may be attributed to shading operations and the remaining 10% to other rendering steps, e.g. hiding, displacement mapping, and the like. As a result, it is desirable to evaluate a sequence of shader computations used in generating a frame to determine if the order or manner of execution of one or more shader routines can be altered to reduce the computational resource or data storage requirements, and thereby reduce the time required to render an image. In particular, it is beneficial to identify calculations that are invariant across an object surface or between frames to reduce the resources used to render the image in a frame or between frames. As an example, this would permit some calculations to be performed once and stored for later use in other parts of the rendering process, rather than being calculated redundantly with the associated and unnecessary use of computational resources. Because a shader routine may have multiple input parameters and be part of a sequence of routines executed in the rendering pipeline, there are many possible variant and invariant parameters to consider when determining which computations are constant across an object or between frames, and which must be recalculated at different points on an object or between two different frames.

What is desired are systems and methods for evaluating the variant and invariant parameters used in shader routines that are part of the rendering pipeline in order to optimize the use of computational and data storage resources when generating computer graphics images in the production of animated films.

SUMMARY

Embodiments of the present invention are directed to a system and method for more efficiently allocating computational and data storage resources during the production of animated films, thereby improving the throughput of a rendering pipeline. Specifically, embodiments of the invention are directed to identifying variant and invariant parameters in inputs or arguments used by a shader routine in the generation of a computer graphics image. Each input or argument may vary or not vary (i.e., it is invariant) with respect to one or more dimensions. These dimensions include, but are not limited to, space (i.e., a location defined by a point on a surface, for example) and time. A variation in the time dimension refers to an input, argument, or parameter that varies between frames of a feature. A variation in the space dimension refers to a variation in spatial co-ordinates, such as variation between points on a surface.

In one embodiment, a shader routine performs one or more calculations on one or more inputs provided to the shader routine. These inputs may represent information about a scene in the frame being rendered, such as orientation (normal, direction, etc.), surface characteristics (color, roughness, shadowing, etc.), and the like. The inputs may also represent the results of a calculation performed previously as part of the rendering pipeline (such as the output from a previous stage of the pipeline). Each input to a shader routine may vary or be invariant with respect to one or more dimensions, where as noted, these dimensions include space and time. As an example, some calculations performed by a shader routine as part of a rendering pipeline may be constant between frames but may vary across a surface within a frame. Similarly, a shader calculation may be constant across a surface but may vary between frames.

The calculations performed by a shader routine may be represented by a directed graph. The directed graph may include nodes connected by links, with each node representing a calculation and the links between nodes representing relationships between the calculations (e.g., the passing of data between calculations). Each parameter or argument input to each node may be identified as one that either varies or is invariant with respect to a particular dimension. Another graphical representation such as a two-dimensional lattice or a possibility table may be constructed to be referenced to determine variability or invariability of each shader calculation with respect to the dimensions of space and time.

In one embodiment, the process of determining how the argument, parameter, or other form of input to a calculation varies or does not vary with respect to a specified dimension is termed a "detail analysis" of the shader routine. For each input parameter to a shader calculation, dimensional variability information about the input parameter is obtained. A lattice or a table representing dimensional variability in each dimension of interest is used to determine a variability value of each calculation. After a variability value has been determined for each calculation, the calculations that share the same variability value are grouped and may be executed once per each value of the variable quantity. The results are reused appropriately during a shading process or other phase of a rendering pipeline rather than re-calculating them at each stage of the process.

In accordance with an embodiment, a method is provided for determining a variability value of each calculation in a shader wherein the shader has a plurality of input parameters varying in two or more dimensions. The method includes obtaining a representation of variability and selecting a first calculation having at least first and second input parameters. A first variability value is obtained for at least two dimensions of the first input parameter, and a second variability value is obtained for at least two dimensions of the second input parameter. From the representation of variability, a third variability value of the first calculation is determined depending on the first and second variability values. The third variability value is assigned to the first calculation.

In accordance with yet another embodiment, a method is provided for evaluating a shader for computer graphics data. The method includes obtaining a directed graph representing dependency relationships of calculations in the shader and a plurality of shader inputs. A variability of each shader input is determined. The variability of each shader input is time-variant/time-invariant and/or space-variant/space invariant. By traversing the directed graph, the variability of each calculation is determined in response to the variability of the shader inputs. The calculations are grouped based on the corresponding variability.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE DRAWINGS

In order to more fully understand the present invention, reference is made to the accompanying drawings. These drawings are understood to not be limitations to the scope of the invention, as the presently described embodiments and the presently understood best mode of the invention are described with additional detail through use of the accompanying drawings.

DETAILED DESCRIPTION OF EXEMPLARY EMBODIMENTS

Figure 1:
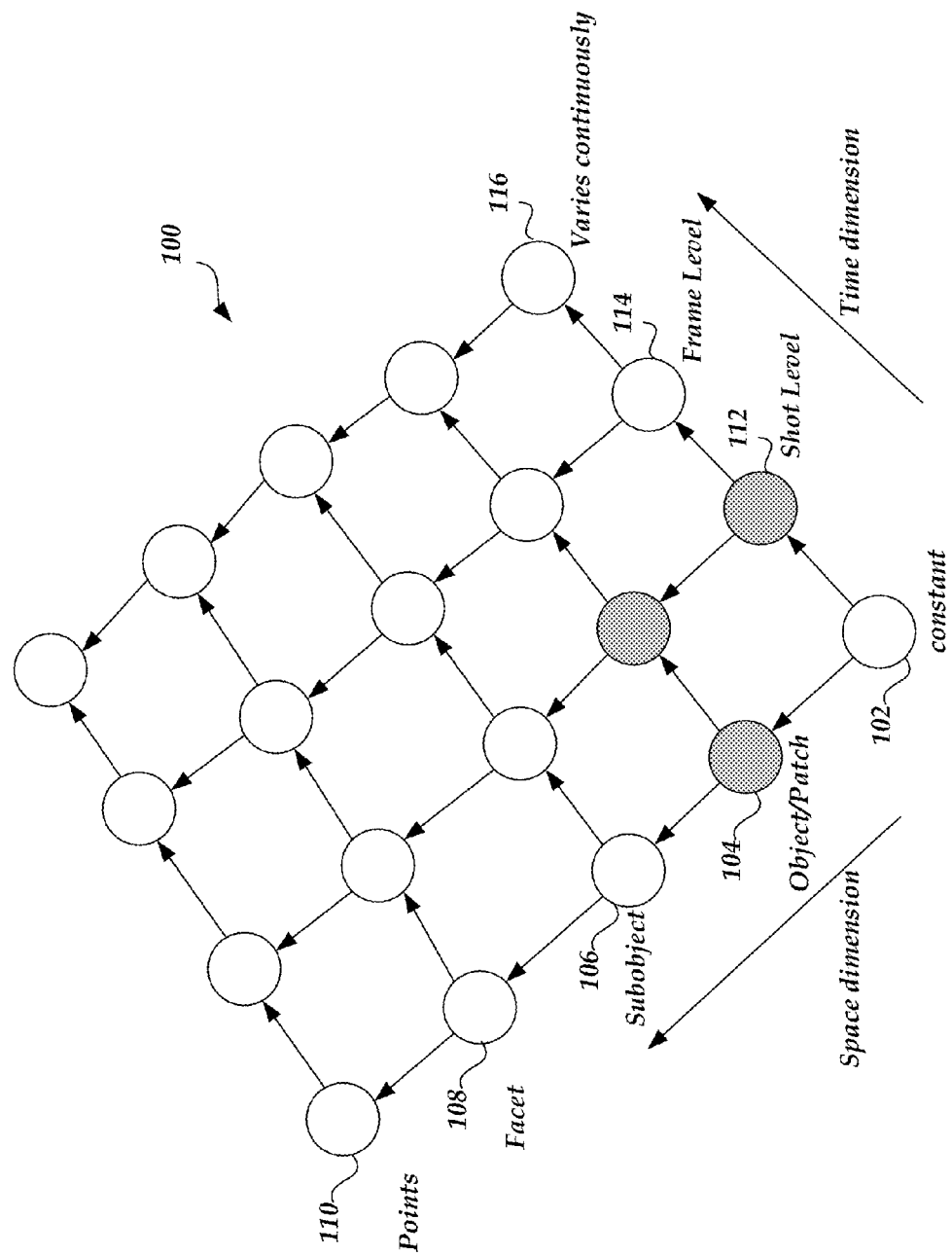
FIG. 1 is a pictorial diagram of a lattice that represents several different degrees of variability, which may be used to practice embodiments of the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

As described herein, the rendering of a computer generated image typically involves executing a set of software routines that are part of a rendering pipeline. Multiple images may be used to construct a scene, with that scene being captured in a frame of a film. Multiple frames, with each representing a scene or scenes as they evolve in time, are combined to form an animation sequence. One or more of these executed software routines may be a shader, which is a routine that performs a set of calculations to determine the appearance of an object in a scene or frame. As noted, some shader calculations vary from place to place on the surface of an object but are the same between frames, i.e., they vary in the dimension of space and are constant in the dimension of time and thus have detail in space but not in time. Such calculations need to be performed at every point on the object surface but they do not need to be re-calculated for every frame of the animation. Other calculations may be the same at every place on the surface of an object but change in value between frames, i.e., they are constant in the dimension of space and vary in the dimension of time and thus have detail in time but not in space. Such calculations only need to be performed once per frame of the animation. Similarly, some shader calculations vary in both the time and space dimensions, and others are constant in both the time and space dimensions.

The dimensions in which each calculation varies and the dimensions in which it is constant depend on its inputs. If any of the inputs vary in a particular dimension, then the shader calculation will also vary with respect to that dimension; similarly, the calculation will be constant in a dimension only if all of its inputs are constant in that dimension. For example, consider a shader calculation X=E*D. If "E" and "D" are varying in time, X varies in time. If "E" is varying in space and "D" is varying in time, X is varying in both time and space. Further, some inputs may vary, but with a different degree or scale of variability in that dimension. For example, if an input varies in time, the input may vary at a shot level (constant over the duration of a shot), a frame level (constant over the duration of a frame, i.e., from shutter open to shutter close), or the like. If any of the inputs vary with a different degree or scale of variability in a particular dimension, then the shader calculation will also vary with a different degree or scale of variability in that dimension. The process of determining how a shader calculation varies (with what degree of variability) or is invariant with respect to one or more dimensions is termed detail analysis.

It is noted that although some embodiments of the present invention are described with regards to shader variation or invariance with respect to the dimensions of space and time, such dimensions are but examples of possible dimensions with respect to which shader inputs may vary or be invariant, and that the present invention may be implemented with respect to other possible dimensions as well.

Conventionally, the analysis of shader calculations is performed with respect to a single dimension, so the detail analysis is relatively straight forward in concept although it may be more complicated to implement. However, attempting to perform a detail analysis with respect to multiple dimensions makes the process more complex.

In one embodiment of the present invention, the shader calculations are represented by a directed graph, with each node of the graph corresponding to a calculation in the shader, and the detail analysis involves following which dimensions are constant and which are varying through the nodes of the graph. In certain embodiments, a directed graph is built in such a way that each connection (link) between nodes indicates a dependency among inputs and outputs of calculations and/or input parameters of the shader. That is, if calculation A uses an output of calculation B, calculation A is considered to be dependent on the output of calculation B. If calculation B varies in a particular dimension, calculation A also varies in that dimension due to its dependency on a varying parameter which is the output of calculation B.

As discussed above, different degrees of variability in each dimension for a calculation may be determined during a detail analysis of a shader. In some embodiments, a lattice or a table is created to represent all possible dimensional variability with respect to predetermined dimensions. Examples of a lattice and a table will be discussed in detail below in connection with FIGS. 1, 3A and 3B. Such a lattice or table may be used as a reference table which can be referenced to determine a "variability value" for each calculation based on its dependency on inputs, arguments, input parameters and the like. The term "variability value", as used herein, refers to information that represents a degree of variability (or a value of the variable quantity) in each predefined dimension. Generally, it can be assumed that if a degree of variability in a particular dimension is increased, a degree of detail in that dimension is also increased (thus more computation may be required to render an image).

It is noted that in some embodiments, a degree of variability is simply indicating whether the calculation is varying or not varying with respect to a particular dimension. For example, one variability value, such as (v, i), can represent that a calculation is varying in space but not varying in time. If a calculation has such a variability value, the calculation needs to be performed at every point on the surface but it does not need to be re-calculated for every frame of the animation. Likewise, another variability value such as (i, v), can represent that a calculation is not varying in space but is varying in time. If a calculation has such a variability value, the calculation it does not need to be performed at every point on the surface but it needs to be re-calculated during the animation.

After a variability value has been determined for each calculation, the calculations that share the same variability value are grouped and may be executed once per each value of the variable quantity. The results are reused appropriately during a shading process or other phase of a rendering pipeline rather than re-calculating them at each stage of the process. In this manner, an amount of redundant computation can be significantly reduced, thereby conserving computational and data storage resources.

As discussed above, the system and method of some embodiments can consider various dimensions for a detail analysis for a shader. In an animated sequence of images (called frames), there are computations that remain the same (are invariant) in one or more dimensions (such as space or time) but may vary in one or more different dimensions. For example, shots may include multiple images using the same geometric background and objects but at different times (non-sequential frames), or shots may include multiple images using the same geometric background and objects but from different camera angles ("angles"). In yet another example, the images in the shot may have almost substantially the same rendering parameters, but have one (or more) rendering parameters that may include varying of one or more light intensities, varying a texturing of a surface (e.g. surface roughness), varying of a light position, varying of "barn door" light boundaries, varying of texture noise frequencies (procedural texture-based noise with frequency controls), and the like. As such, for a given set of dimensions, shader calculations can vary in one dimension but be constant or invariant in other dimensions due to dependency of input parameters.

Input Parameters and Calculations of Shader

As discussed above, a rendering pipeline typically uses shaders to describe the interactions of lights and surfaces. Generally, shaders control the calculation of the color and other surface characteristics of the objects in a scene. For example, a surface shader may be used to calculate the color and opacity at a particular point on some surface. Each shader routine has one or more input arguments or parameters that are used by the routine to calculate the surface or object characteristics.

In some embodiments, in a shading process, an object may be diced or divided into polygons called micropolygons equal to or smaller than the pixel size. In one embodiment, high-level primitives of an image are used to implicitly specify geometric primitives of the image. The shader system obtains an input primitive of the patch of image and divides the input primitive into polygons called micropolygons equal to or smaller than the pixel size. In some cases, the input primitive may be divided into smaller primitives when the input primitive is not small enough to process. Subsequently, the small primitive (or sub-primitive) may be diced so that the small primitive is converted into a common data format, called a "grid." A "grid," as used herein, refers to a tessellation of the primitive into an array of small triangular or quadrilateral facets known as micropolygons. The vertices of the facets are the computer graphics data points that may be shaded. Each grid retains all of the input primitive's attributes, and any primitive vertex variables that were attached to the primitive have been interpolated onto every vertex in the grid. The computer graphics data points (vertices) of the grid are then passed into the shading system to be shaded. Various shaders, including displacement shaders, surface shaders, and light shaders, may be evaluated in a particular order by the shading system. In general, a shader is designed to work on all of the data points in a grid. Shaders have several input quantities (e.g., input parameters or arguments), such as the location of the vertex in the scene, the surface normal, and temporary values. Attributes of surfaces can include optical properties of a surface, such as color, transparency, reflectivity, and refractivity.

In the current embodiment, a typical shader includes shading functions (calculations) and input parameters, where input parameters may vary or be invariant with respect to one or more dimensions. These dimensions, include, but are not limited to space and time. As noted, for shading functions and input parameters that do not change for an object in one particular dimension, such shading functions and parameters are termed "invariant". Further, shading functions and input parameters that do change for an object in one particular dimension are termed "variant". For example, in the temporal dimension, if input parameters do not change between frames, such input parameters are termed "time-invariant". If input parameters change between frames, such input parameters are termed "time-variant". In some cases, certain of the time-variant parameters may vary, but with a different degree or scale of variability in time. For example, certain of the input parameters may vary at a shot level (constant over the duration of a shot), a frame level (constant over the duration of a frame, i.e., from shutter open to shutter close), or the like.

In one embodiment of the present invention, a typical shot may represent 1 second to 30 seconds of images. In some embodiments, a shot may be from 12 frames to 1000 frames, may be from 2 to 2400 frames or greater, and the like. A typical shot is about 80 frames or a little over 3 seconds. Further, to render a typical animated movie, up to 90% of the rendering time may be attributed to shading and 10% to other rendering steps, e.g. hiding, displacement mapping, and the like. Thus, implementing a group of shader computations on surface points once for a specified dimension (in the case where those computations are invariant with respect to that dimension) can significantly reduce the computational resources used, and hence the rendering time, for that frame or sequence of frames.

Consider an example shader as follows:
surface
   paintedplastic (float Ka=1, Kd=0.5, Ks=0.5, roughness=0.1;
   color specularcolor=1;
   )
   {/* simple plastic-like reflection model */
   normal Nf=faceforward (Normalize(N), I);
   vector V=−normalize (I);
   Ci=Cs * (Ka * ambient( )+Kd * diffuse (Nf))+specularcolor * Ks * specular (Nf, V, roughness);
   Oi=Os; Ci *=Oi;
}
For this shader:
Ka represents a user defined ambient light parameter;
Kd represents a user defined diffuse light parameter;
Ks represents a user defined specular parameter;
N is a global parameter, representing a normalized vector from a surface position;
I is a global parameter, representing a vector from the viewing position to the surface position;
Nf is a forward-facing version of N. It equals N for surfaces that face the viewing and −N for surfaces that face away from the viewer;
V represents a normalized vector from the surface position to the viewing position; specularcolor represents a user defined specular color parameter;
Cs a global parameter, representing a default surface color parameter of the object;
Ci represents a local illumination model for the object; and
Oi represents the final opacity.

Using the example above, many of the parameters, such as Ka, Kd, Ks, roughness, specularcolor, and the like are normally held constant in space, that is, they are the same value across multiple points on a surface. As a result, generally these parameters are considered as space-invariant parameters. It is, however, noted that such parameters can be a function of time, i.e. they may be time-variant. As another example, to render a chameleon-type object that changes colors over time, the parameter Cs may change and vary with time. As will be appreciated, an input parameter can be space-invariant and time-variant. Likewise, an input parameter can be space-variant and time-invariant or space-variant and time-variant.

In one embodiment, some of the shading parameters for an object may be a function of time (varying in time). For example, the vector I changes as the camera is moved between image frames, and the functions ambient( ), diffuse( ), and specular( ) change as lights are added, subtracted, or repositioned between image frames. As will be discussed in greater detail below, the time-invariant shading calculations and the time-variant shading calculations of a particular shader routine may be identified by performing a detail analysis of the shader and the calculations it performs.

Lattice

Referring now to FIG. 1, a pictorial diagram depicts a lattice 100 which may be used to practice embodiments of the present invention. In some aspects, the lattice used herein is a graph that may be based on the concept of a mathematical lattice. In mathematics, a lattice is a partially ordered set in which any finite subset has a least upper bound and a greatest lower bound. The lattice described in some embodiments of the present invention is a graph with such a property. In some embodiments, the lattice can represent a degree of variability in two or more predetermined dimensions, each dimension having a corresponding axis in the lattice. In one embodiment, an increment along a dimension axis in the lattice means more degrees of variability in that dimension. Each degree of variability may be predefined as needed for a detail analysis. The simplest form may be two levels of variability, such as "invariant" and "variant". The use of a lattice in some embodiments will be discussed in further detail below in connection with FIGS. 2-4.

As discussed above, the lattice used herein is constructed to represent all possible variability values with respect to predetermined dimensions. As such, the lattice is referenced to determine a variability value of a shader calculation based on its dependency on inputs, arguments, parameters and the like during the detail analysis of the shader. For example, consider a shader computation that has an input parameter having a node A and another input parameter having a node B in the lattice. An upper bound of the node A and node B, which is node C, is determined from the lattice and the variability value of the shader computation can be referenced from the node C in the lattice. As such, based on how the inputs vary with respect to one or more dimensions, the variability value of a shader computation can be determined by referencing the lattice or table. The shader computation can be grouped based on its variability value. Further, as recognized by the inventors, shader computations sharing the same variability value may be implemented together and re-used during the rendering process.

As shown, the lattice 100 can include nodes representing several different degrees of variability (thus requiring more computation to be performed) in time, such as a constant level (constant for all frames in all shots), a shot level (constant over the duration of a shot), and a frame level (constant over the duration of a frame, i.e., from shutter open to shutter close). Likewise, the lattice can include nodes representing several different degrees of variability (i.e., different levels of details required) in space, such as a constant level, an object/patch level, a subobject level, a facet level, a point level (continuously varying level), etc. For each degree of variability with respect to a particular dimension, a certain value can be assigned for ease of implementation. A variability value can be represented by any ordered set of characters or numbers. For example, i, v, v1, v2, v3, v4 can be used for each degree or 0, 1, 2, 3, 4, 5 can be used for each degree of variability in time or space.

As shown in FIG. 1, a node 102 represents a constant value that does not vary in time or space. With regard to a spatial dimension, a node 104 represents a variability value for a shader calculation that receives inputs varying at an object/patch level. A node 106 represents a variability value for a shader calculation that receives inputs varying at a subobject level. A node 108 represents a variability value for a shader calculation that receives inputs varying at a facet level, and so on. Note that as one moves along the spatial dimension axis on the lattice, the variability of the shader input parameter or argument being considered changes from being constant in that dimension to varying over different levels or regions (e.g., object level to subobject to facet to point wide variation). Likewise, in the temporal dimension, a node 112 represents a variability value for a shader calculation that includes inputs varying at a shot level. A node 114 represents a variability value for a shader calculation that includes inputs varying at a frame level. A node 116 represents a variability value for a shader calculation that includes one or more inputs that vary continuously in the time dimension. Such different degrees of variability in each dimension may be determined during a detail analysis of a shader.

Detail Analysis

Figure 2:
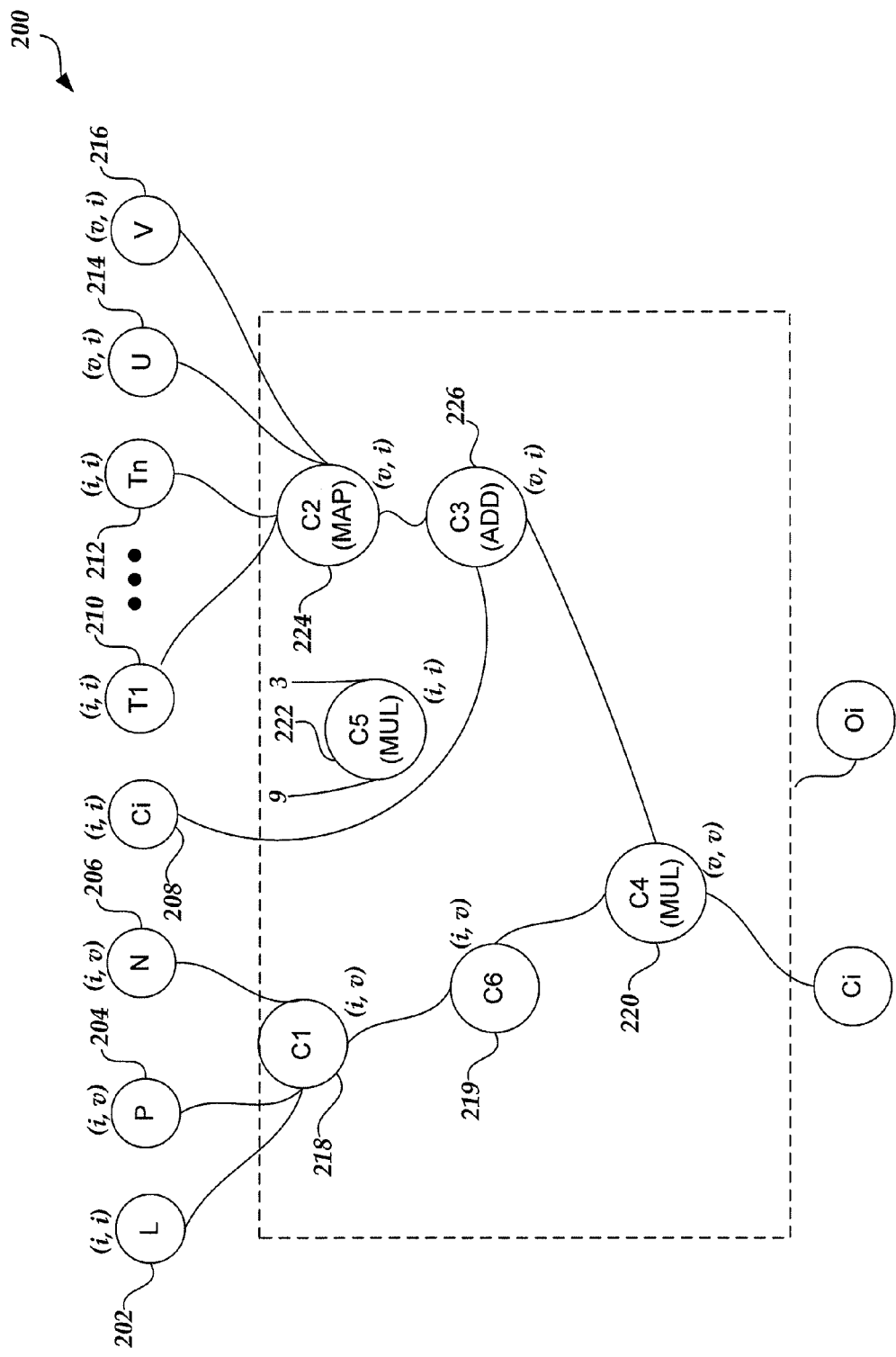
FIG. 2 is a pictorial diagram of a directed graph that is built during a detail analysis of a shader, which may be used to practice embodiments of the present invention.

Referring now to FIG. 2, which is a pictorial diagram depicting a directed graph 200 that may be constructed as a result of performing a detail analysis of a shader, and that may be used to practice embodiments of the present invention.

As shown, a directed graph 200 represents input and output dependencies among shader calculations and input parameters of the shader. In one embodiment, the directed graph may include nodes representing input parameters of the shader and nodes representing calculations. In the directed graph, a node representing each calculation receiving one or more input parameters is linked to the nodes of the input parameters. Likewise, nodes representing two calculations are linked, indicating a dependency relationship among those calculations (i.e., one calculation receives an output of another calculation as its input).

The directed graph 200 may be traversed to determine variability information (a variability value) of a calculation. As discussed above, the variability value of a calculation is determined based on the variability values of inputs including input parameters of the shader, outputs of other calculations on which the calculation depends, or the like.

In some embodiments, for given input parameters, the rendering engine or system may be able to statically determine variability values of input parameters, such as which input parameters to the shading calculations vary in time or space, or another dimension of interest. Alternatively or optionally, the rendering engine or system may automatically or dynamically determine variability values of input parameters or dependencies among shading operations (calculations), and input parameters or outputs of other shading calculations.

By way of example, directed graph 200 may include one or more input parameter nodes 202-216 and calculation nodes 218-226. As shown, the shader program that is represented by directed graph 200 has "L", "Cs", "N", "T[u,v]", "U", and "V" input parameters for its shader calculations. In the present embodiment, a variability value of each input parameter can be statically determined from the shader. For example, input parameter L (light) 202 and input parameter Cs 208 are not varying in time or space because lights are typically not moving around and are the same at every point in space, and default surface colors are generally the same at every point in space and do not change over time. Similarly, input parameter N (normal) 206 is typically space-invariant but time-variant since N may be the same at every point in space but varying in time. In one embodiment, points, vectors and normals are similar data types with identical structures but different semantics. A point is a position in 3D space; a vector has a length and directions but does not exist at a particular location; and a normal is a special type of vector that is perpendicular to a surface and thus describes the surface's orientation. Likewise, the texture coordinates U 214 and V 216 may be varying in space but not in time. Input parameter T[u,v] 212 (texture map which is an array of pixels indexed by u,v) is space-invariant and time-invariant. It is noted that variability values of these parameters can differ in other shaders as some parameters may be a function of time. As shown in FIG. 2, such variability values are associated with nodes for input parameters 202-216 in the directed graph 200. The variability value of an input parameter is used to determine a variability value of a shader calculation that directly or indirectly depends on the input parameter. After variability values for input parameters are obtained or determined, a variability value for each calculation can be determined. Subsequently, a node for each calculation in the directed graph 200 may be associated with the determined variability value. The process for determining a variability value for each calculation is discussed further below in connection with FIG. 4.

Figures 3A, 3B:
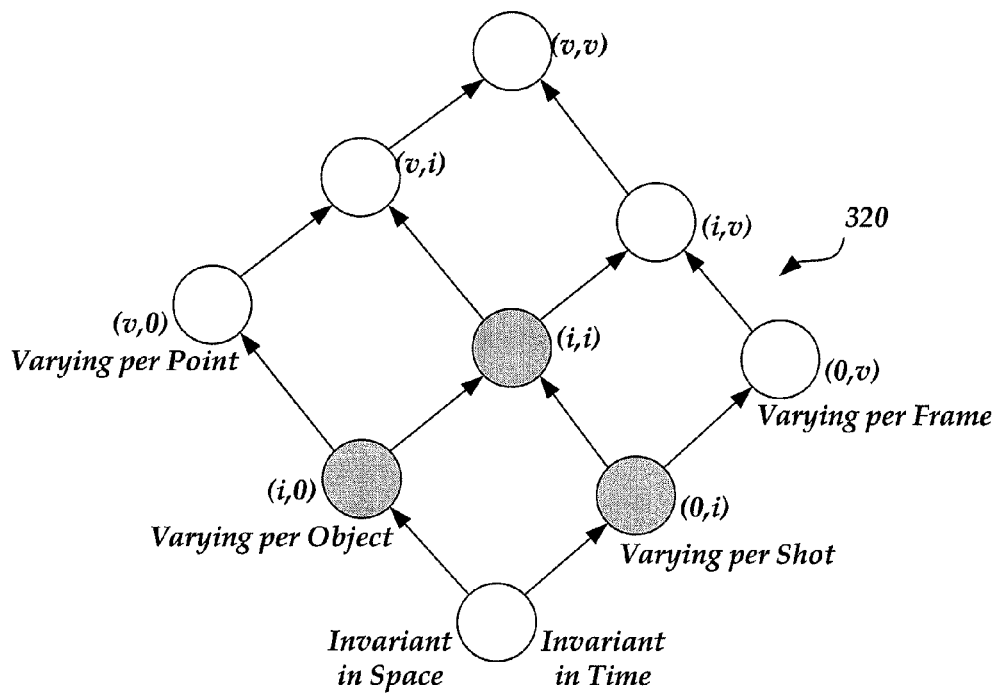
FIG. 3A is a pictorial diagram of a table of possibilities that represents variability values in time and space, which may be used to practice embodiments of the present invention.
FIG. 3B is a pictorial diagram of a lattice that represents variability values in time and space, which may be used to practice embodiments of the present invention.

For the sake of discussion, in embodiments and examples described herein, two dimensions, such as a spatial dimension and a temporal dimension are considered during the detail analysis and two levels of variability, such as "invariant" and "variant", will be determined with respect to the spatial dimension and temporal dimension. Referring to FIG. 3B, a lattice 320 having three levels of variability is depicted.

In some embodiments, each input parameter node in the directed graph may be associated with a variability value, in this case, represented as a pair of a space variability level (i.e., per object and per point) and a time variability level (i.e., per shot and per frame), such as (s, t). For example, as shown in FIG. 3B, if an input parameter or shader calculation is varying per object and per shot, a value of (i, i) will be assigned to a node representing the input parameter or the calculation. If an input parameter or calculation is varying per object and per frame, a value of (i, v) will be assigned. If an input parameter or calculation is varying per point and per shot, a value of (v, i) will be assigned. If an input parameter or calculation is varying per point and per frame, a value of (v, v) will be assigned. In this example, if a shader calculation receives an input with (i, i) and an input with (i, v), the calculation has a variability value of (i, v) which is an upper bound of (i, i) and (i, v) in the lattice.

It is noted that the lattice discussed herein is described for illustrative purposes. In one embodiment, a table of possibilities can be used as part of the detail analysis. Referring now to FIG. 3A, a table of possibilities 300 also representing variability values in time (i.e., per shot and per frame) and space (i.e., per object and per point) is depicted. It is further noted that dimensions other than space or time can be included as part of a detail analysis and represented in a lattice, such as the number of light sources, a position of lenses, and the like.

Figure 4:
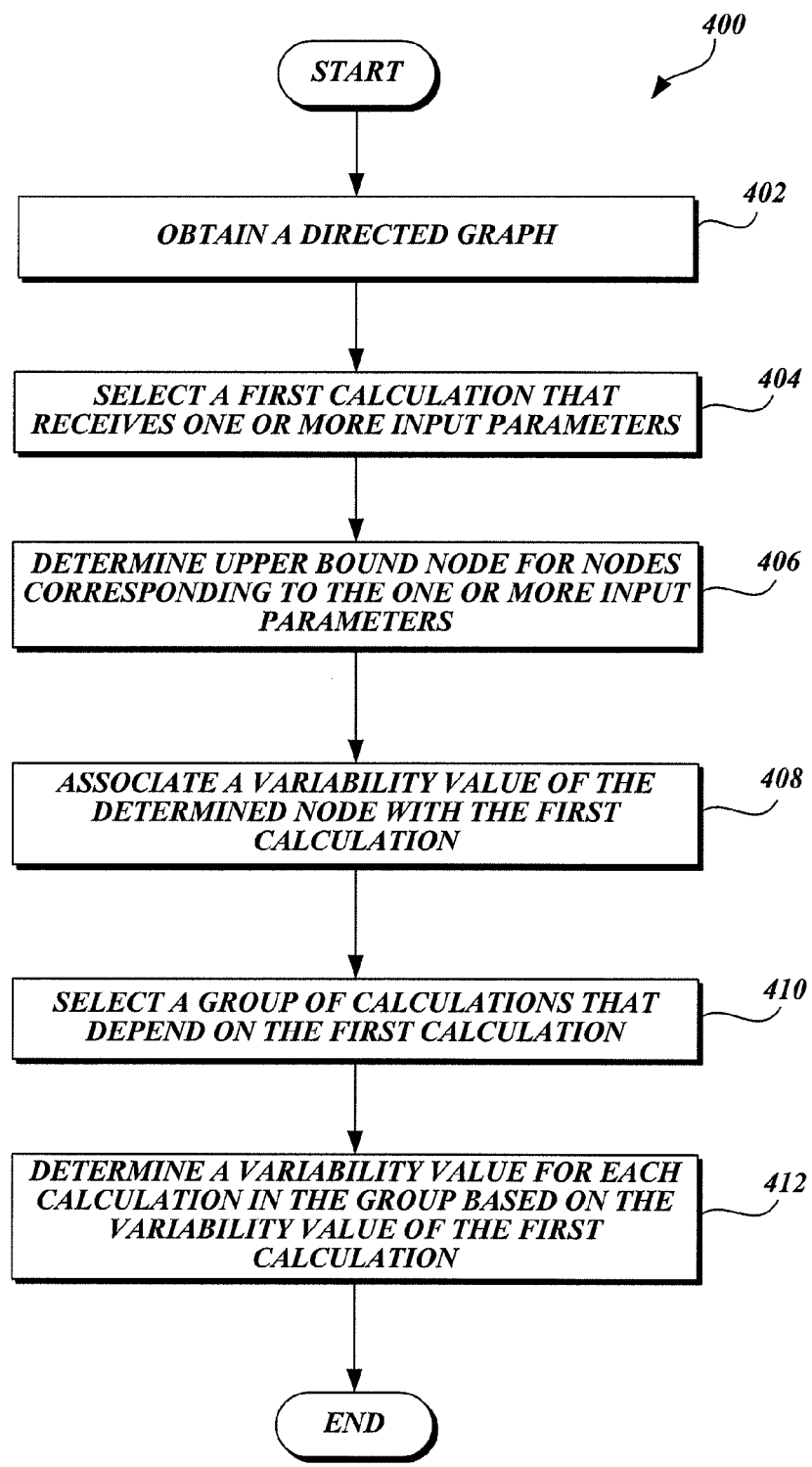
FIG. 4 is a flow diagram that depicts a process for determining a variability value for each calculation in shader, which may be used to practice embodiments of the present invention.

Referring to FIG. 4, a flow diagram 400 for a process for determining a variability value for each calculation is depicted. As with FIG. 2, a lattice 320 (FIG. 3B) may be referenced to determine a variability value for each calculation. In one embodiment, a directed graph that was constructed by analyzing inputs and outputs of calculations is used during the process for determining a variability value. It is assumed that the directed graph includes nodes, each of which correspond to an input parameter of the shader or a calculation of the shader. The directed graph includes links between nodes representing relationships between the calculations (e.g., the passing of data between calculations).

Beginning with block 402, a directed graph that represents dependencies among inputs and outputs of calculations in a shader for an object is obtained. The directed graph includes several nodes, each of which corresponds to an input parameter of a shader or a calculation. The input parameter is a parameter passed to the shader by the renderer. Each connection between nodes indicates a dependency among inputs and outputs of calculations and/or input parameters. Initially, the nodes of input parameters are associated with variability values in the format of (s, t), representing a space variability level (s) and a time variability level (t). At block 404, a first calculation that receives at least one input parameter is identified from the directed graph. Referring to FIG. 2, there are three calculations that can be identified as a first calculation:
"C1" that receives input parameters "L", "N";
"C2" that receives input parameters "T[u,v]", "U", "V"; and
"C3" that receives an input parameter "Ci".

At block 406, in the lattice, an upper bound for the lattice nodes corresponding to the input parameters for the first calculation is determined. At block 408, a variability value of the determined upper bound is associated with the first calculation. For example, referring to FIG. 3B, if the first calculation has two input parameters, one parameter is varying per object and varying per shot and thus has a value of (i, i); the other is varying per object and varying per frame and thus has a variability value of (i, v). In the lattice 320 of FIG. 3B, the upper bound node for a variability value of (i, i) and a variability value of (i, v) has a value of (i, v). Accordingly, a variability value of (i, v) is associated with the first calculation, indicating that the first calculation is variant in space and variant in time. In some instances, the first calculation may already have a variability value assigned. In such instances, an upper bound of variability values related to the first calculation may be determined. Referring back to FIG. 2, "C3" is a first calculation and also depends on the output of "C2." Thus, if "C2" has been analyzed before "C3" during the detail analysis, "C3" has a variability value of "C2" which is (v, i). Consider another example, assume that the first calculation already has a value of (v, i) due to dependency of other calculations, and its input parameters (shader input) have values of (i, i) and (i, v). In such a case, the upper bound is a value of (v, v) in the lattice 320 and thus, the first calculation has a value of (v, v) as its variability value.

At block 410, from the directed graph, a group of calculations that depend on the output of the first calculation is obtained. At block 412, for each calculation in the group, a variability value of the calculation is determined and then associated with the calculation. Generally, the variability value of the first calculation is associated with the calculation in the group. However, if the calculation has a previous variability value assigned due to its dependency on other calculations, an upper bound of the previous variability value and the variability value of the first calculation are determined from the lattice. The upper bound variability value is associated with the calculation. The routine 400 repeats the above mentioned steps for all the calculations in the shader. In this manner, the variability value of shader input parameters can be propagated through the calculations in the shader. In one embodiment, information about the variability values for shader calculations may be stored separately in a file or local memory for assisting in improving the efficiency of a shading process. In another embodiment, information about the variability values for a shader may become part of a directed graph. Each node of the directed graph may include a variability value for a corresponding calculation or input parameter.

Returning to the exemplary directed graph shown in FIG. 2, in the directed graph 200, calculation C1 represented by node 218 has a time-invariant parameter (light) and time-variant parameters (normal) as inputs. Node 218 (representing C1) has a value of (i, v) as its variability value. C6 depends on an output of C1 and thus node 219 representing C6 has a value of (i, v) as its variability value. C5 represented by node 222 has input parameters which are constant; thus node 222 (representing C5) has a value of (i, i) as its variability value. C2 receives input parameters such as T[u,v] having (i, i), U having (v, i), and V having (v, i) and thus has a value of (v, i), which is the upper bound of (i, i), (v, i) and (i, v) is associated with node 224 representing C2. C3 depends on an output of C2 and thus node 226 representing C3 has a value of (v, v). C4 depends on outputs of C1 and C2 and thus node 220 representing C4 has a value of (v, v), which is the upper bound of (i, v) and (v, v) in lattice 320.

After all the calculations in the shader have been associated with their respective variability values, the calculations are grouped based on their variability value so that redundant implementation can be avoided. For example, C2 and C3 are grouped into one group for the variability value (v, i). C2 and C3 are not varying in space but are varying in time. Thus, C2 and C3 are implemented for each frame but not for each point in the frame. C1 and C6 are grouped into a group for the variability value (i, v). Thus, C1 and C6 are not implemented for each point in the frame but implemented once and used for each frame. C4 is grouped into a group for the variability value (v, v). Thus, C4 is implemented for each point in the frame and for each frame. C5 is grouped into a group for the variability value (i, i). C5 is constant and only calculated once. As such, the calculations in each group are implemented in accordance with a level of variability in space and time and reused appropriately during a shading process. In some cases, one particular dimension may be selected and considered in order to group shader calculations based on variability.

Temporal Dimension Variability

Figure 5:
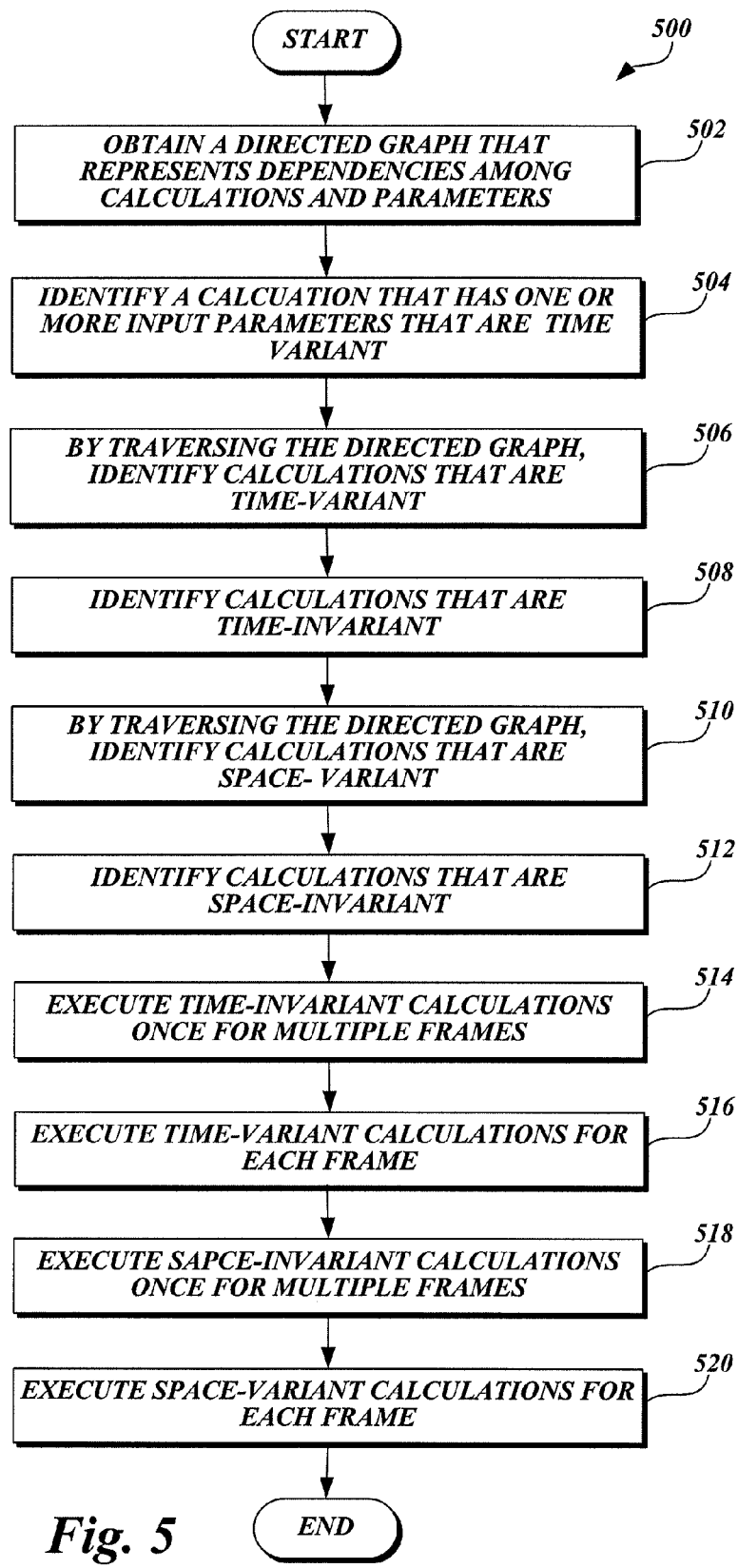
FIG. 5 is a flow diagram that depicts a process for identifying time-variant calculations over time-invariant calculations in a shader, which may be used to practice embodiments of the present invention.

Referring now to FIG. 5, a flow diagram 500 depicts a process for identifying time-variant calculations and time-invariant calculations in a shader, and which may be used to practice embodiments of the present invention. For ease of discussion, assume that a directed graph has been built for the shader. As discussed above, each node of the graph corresponds to a calculation in the shader and each connection (link) between nodes indicates a dependency among inputs and outputs of calculations and/or input parameters of the shader. Assume that a variability value for each input parameter has been statically or dynamically determined from the shader. It is also assumed that as with FIG. 4, the two dimensional lattice depicted in FIG. 3B is also used in connection with the process depicted in FIG. 5. At block 502, the directed graph built for the shader is obtained. As discussed above, the directed graph represents dependency relationships among inputs and outputs of calculations. At block 504, a calculation that has one or more input parameters that are time-varying is identified in the directed graph. A variability value for the calculation is determined based on variability values for the input parameters. At block 506, by traversing the directed graph, the system identifies a first group of calculations that are time-variant. At block 508, the system identifies a second group of calculations that are time-invariant. At block 510, by traversing the directed graph, the system identifies a third group of calculations that are space-variant. For example, if one or more lights move or are turned on/off in a series of images, or the object or the camera moves between images but the object does not move, such shader calculations are space-variant and time-variant. This is because an input parameter, such as the position P, is space-variant for stationary objects because the position of the vertex is not the same at all places on the object and is time-variant because the object is animated due to the light or the camera's movement. At block 512, the system identifies a fourth group of calculations that are space-invariant.

At block 514, the rendering engine performs the time-variant shading calculations from the first group for each frame. The rendering engine performs the time-invariant shading calculations once per frame in a shot at block 516. As an example, referring to the shading code above, if the default surface color Cs and the texture map do not depend upon time, Ct may be calculated for the object once for the shot and can be reused for rendering frames in the shot. At block 518, the rendering engine performs the space-variant shading calculations from the third group for each frame. The rendering engine performs the space-invariant shading calculations once per frame in a shot at block 520. It is to be noted that these calculations result in one or more intermediate shot shading values for the object. These intermediate shading values of the time-invariant and space-invariant shading calculations may be stored in program memory or on disk memory.

After the calculations are performed per group, intermediate image shading values may also be stored in program memory or on disk memory and will be used whenever they are needed as part of the shader routine computations.

It is noted that the aforementioned methods and routines are mostly described in conjunction with the use of shaders for ease of discussion. However, it will be appreciated by those of ordinary skill in the art that such method and routines could be applied to any applications in which parameters could vary in more than one dimension. Thus, the discussion of the shaders should be taken as being illustrative in nature, and not limiting to the scope of the disclosure.

In the current embodiment, for each image (frame), the rendering engine then performs the final shading computations for the object in the shot. In one embodiment, the intermediate shading values for the object are mathematically combined resulting in a final shading value for most of the grids of the object.

When all objects have been rendered, the resulting images in the shot may then be output for viewing, converted to analog form (e.g. film, video tape), formatted for a digital media output device, or the like. Although the process described above is discussed in conjunction with time-variant and space-variant parameters (time and space dimensions), the process can be extended to other dimensions. Thus, a lattice can be built to have several axes representing various dimensions, including, but not limited to, space, time, the position on the lens from which the scene is viewed, the position on an area light source from which the object is illuminated, etc. The area light source refers to a light source that emits light from some or all points in a specific and finite region of space. The area light source differs from a point light source which refers to a light source that emits light from a single point in space.

In the foregoing specification, the invention has been described with reference to specific exemplary embodiments. Many changes or modifications are readily envisioned. In light of the above disclosure, one of ordinary skill in the art would recognize that any number of additional rendering steps may be introduced into the rendering process described below. In light of the above disclosure, one would recognize that for an object, such additional rendering steps may have calculations that may be varying in one or more dimensions discussed above. Accordingly, one would recognize that some calculations may be performed on the object as infrequently as once for the entire shot. Further, one would recognize that some calculations may be performed for each frame, each point, each object, etc. It is envisioned that a great number of shaders currently compatible with RenderMan™ could be used in embodiments of the present invention.

The above flow or process diagrams may be implemented as computer code and may or may not be compiled into processor executable code. The codes may be stored as a program in a tangible media such as a local disk drive, network storage drive, or the like. In an alternative embodiment, the codes may be dynamically generated by another program. For example, a first program may be used to generate on-the-fly an executable program that operates in the manner described above.

In one embodiment, execution of calculations may be processed in parallel based on their variability values. In another embodiment of the present invention, each of these processes may be embodied as separate and unrelated execution processes. Using a multithreaded operating system, processes may be executed at substantially the same time, may be simply overlapped in time, or the like. In a parallel processor environment, processes may be executed in parallel. In yet another embodiment, some processes may actually be completed before other processes.

Figure 6:
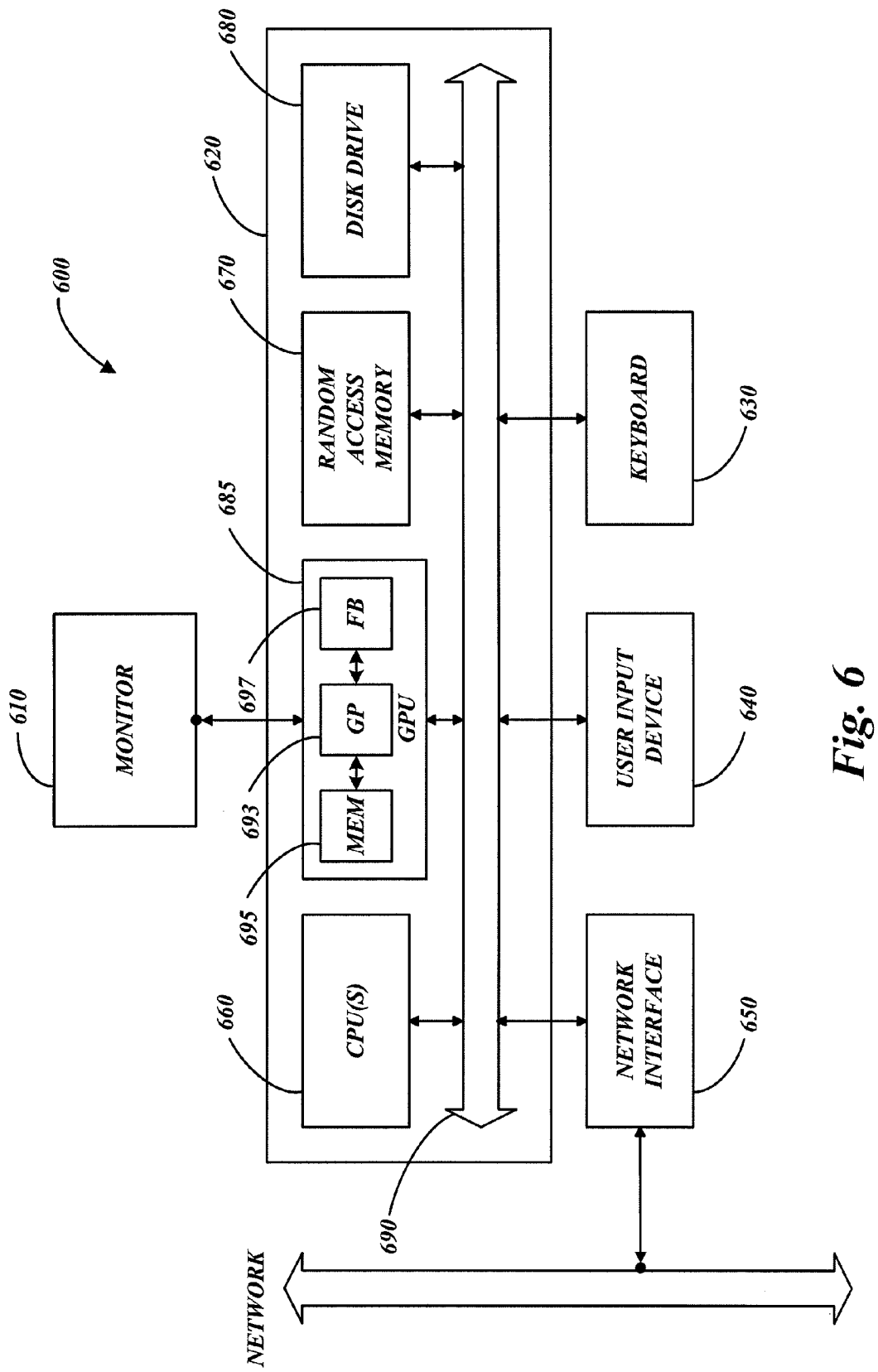
FIG. 6 is a simplified block diagram of a computer system that may be used to implement embodiments of the present invention.

FIG. 6 is a block diagram of a computer system that may be used to practice embodiments of the present invention. FIG. 6 is merely illustrative of an embodiment incorporating the present invention and does not limit the scope of the invention as recited in the claims. One of ordinary skill in the art would recognize other variations, modifications, and alternatives.

In one embodiment, computer system 600 typically includes a monitor 610, computer 620, a keyboard 630, a user input device 640, network interfaces 650, and the like.

In various embodiments, user input device 640 is typically embodied as a computer mouse, a trackball, a track pad, a joystick, wireless remote, drawing tablet, voice command system, eye tracking system, and the like. User input device 640 typically allows a user to select objects, icons, text and the like that appear on the monitor 610 via a command such as a click of a button or the like.

Embodiments of network interfaces 650 typically include an Ethernet card, a modem (telephone, satellite, cable, ISDN), (asynchronous) digital subscriber line (DSL) unit, FireWire interface, USB interface, and the like. For example, network interfaces 650 may be coupled to a computer network, to a FireWire bus, or the like. In other embodiments, network interfaces 650 may be physically integrated on the motherboard of computer 620, and may be a software program, such as soft DSL, or the like.

In various embodiments, computer 620 typically includes familiar computer components such as a processor 660, and memory storage devices, such as a random access memory (RAM) 670, disk drives 680, a GPU 685, and a system bus 690 interconnecting the above components.

In some embodiment, computer 620 includes one or more Xeon microprocessors from Intel. Further, in one embodiment, computer 620 includes a UNIX-based operating system.

RAM 670 and disk drive 680 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 685 may be any conventional graphics processing unit that may be user programmable. Such GPUs are available from NVIDIA, ATI, and other vendors. In this example, GPU 685 includes a graphics processor 693, a number of memories and/or registers 695, and a number of frame buffers 697.

As noted, FIG. 6 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Embodiments of the present invention may be applied to any number of rendering platforms and for a variety of purposes. For example, embodiments may be used on engineering workstations for development purposes, on visualization systems for artists and animators, in a rendering farm machine for final production, and the like. Accordingly, the concepts disclosed above are extremely valuable in a variety of applications.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for determining a variability value of each calculation in a shader, wherein the shader includes a plurality of calculations and receives a plurality of input parameters varying in two or more dimensions, the method comprising:
   obtaining, with one or more processors associated with one or more computer systems, a representation of variability;
   selecting, with the one or more processors associated with the one or more computer systems, a first calculation from the plurality of calculations, wherein the first calculation comprises a first input parameter and a second input parameter;
   obtaining, with the one or more processors associated with the one or more computer systems, a first variability value for at least two dimensions of the first input parameter;
   obtaining, with the one or more processors associated with the one or more computer systems, a second variability value for at least two dimensions of the second input parameter;
   determining, with the one or more processors associated with the one or more computer systems, a third variability value of the first calculation based on the first variability value, the second variability value, and the representation of variability; and
   generating, with the one or more processors associated with the one or more computer systems, information assigning the third variability value to the first calculation.

2. The method of claim 1, wherein the representation of variability includes several nodes, each node representing a variability value including a degree of variability for each dimension.

3. The method of claim 2, wherein the third variability value is obtained from an upper bound of nodes in the representation of variability, the nodes corresponding to the one or more input parameters of the first calculation.

4. The method of claim 2, wherein the representation of variability is a lattice in which, for any given nodes, upper and lower bounds of the nodes are predefined.

5. The method of claim 1, wherein the first variability value and the second variability value are predetermined.

6. The method of claim 1, wherein the representation of variability is a two dimensional lattice that is used to determine variability or invariability of each calculation with respect to dimensions of space and time.

7. The method of claim 1, wherein a dimension in the representation of variability is one of space, time, a position of a lens from which a scene is viewed, or a position on an area light source from which an object is illuminated.

8. The method of claim 7, wherein a directed graph representing dependencies among inputs and outputs of the plurality of calculations is used to identify the second calculation.

9. The method of claim 1, further comprising:
   identifying a second calculation from the plurality of calculations, wherein the second calculation depends directly or indirectly on an output of the first calculation; and
   determining, from the representation of variability, a fourth variability value of the second calculation based on the first and second variability values of the first calculation.

10. The method of claim 1, wherein the plurality of calculations are grouped for execution based on a corresponding variability value assigned to each calculation.

11. The method of claim 1, wherein an amount of computation required for each calculation of the shader is correlated with the first and second variability values assigned to the first calculation.

12. A non-transitory computer readable medium storing a set of code modules which when executed by a processor of a computer system cause the processor to reduce an amount of computation required for a shader to process computer graphics data, wherein the shader includes a plurality of calculations, the non-transitory computer-readable medium comprising:

code for obtaining a representation of variability that includes several nodes, wherein each node represents a variability value including a degree of variability for each dimension; and for each calculation, from the plurality of calculations, that receives one or more inputs varying in two or more dimensions:

code for obtaining a first variability value of each input, wherein the first variability value of the input is previously determined;

code for determining, from the representation of variability, a second variability value of the calculation based on the first variability value of each input; and code for assigning the second variability value to the calculation, wherein the second variability value is used for determining an amount of computation required for each calculation.

13. The non-transitory computer-readable medium of claim 12, wherein the second variability value of the calculation is obtained from an upper bound of nodes in the representation of variability, the nodes corresponding to the one or more inputs of the calculation.

14. The non-transitory computer-readable medium of claim 12, wherein the representation of variability is a lattice in which, for any given nodes, upper and lower bounds of the nodes are predefined.

15. The non-transitory computer-readable medium of claim 12, wherein a dimension in the representation of variability is one of space, time, a number of lights, or a position of lenses.

16. The non-transitory computer-readable medium of claim 12, wherein the calculations sharing a same variability value are executed together.

17. The non-transitory computer-readable medium of claim 12, wherein the one or more inputs include an output of another calculation on which the calculation depends.

18. The non-transitory computer-readable medium of claim 12, wherein the one or more inputs include an input parameter of the shader.

19. A method for evaluating a shader for computer graphics data, the method comprising:

obtaining, with one or more processors associated with one or more computer systems, a directed graph representing dependency relationships of a plurality of calculations in the shader and a plurality of shader inputs;

determining, with the one or more processors associated with one or more computer systems, a variability of each shader input, wherein the variability of each shader input is one of: constant in space and time, varying in space and time, varying in space and constant in time, and constant in space and varying in time;

by traversing the directed graph, determining, with the one or more processors associated with one or more computer systems, the variability of each calculation in response to the variability of the shader inputs; and generating, the one or more processors associated with one or more computer systems, information grouping the calculations according to the variability of each calculation.

20. The method of claim 19, wherein generating the information grouping the calculations further comprises:

grouping the calculations that are varying in time into a time-variant calculation group; and grouping the calculations that are constant in time into a time-invariant calculation group.

21. The method of claim 20, further comprising:

determining an intermediary time-variant output by executing the time-variant calculation group on the computer graphics data for each frame of a plurality of frames; and storing the intermediary time-variant output in a file.

22. The method of claim 20, further comprising:

determining an intermediary time-invariant output by executing the time-invariant calculation group on the computer graphics data once for a plurality of frames; and storing the intermediary time-invariant output in a file.

23. The method of claim 19, wherein grouping the calculations further comprises:

grouping the calculations that are varying in space into a space-variant calculation group; and grouping the calculations that are constant in space into a space-invariant calculation group.

24. The method of claim 23, further comprising:

determining an intermediary space-variant output by executing the space-variant calculation group on the computer graphics data for each frame of a plurality of frames; and storing the intermediary space-variant output in a file.

25. The method of claim 23, further comprising:

determining an intermediary space-invariant output by executing the space-invariant calculation group on the computer graphics data once for a plurality of frames; and storing the intermediary space-invariant output in a file.

* * * * *